US012586247B2

(12) United States Patent
Lee et al.

(10) Patent No.: US 12,586,247 B2
(45) Date of Patent: Mar. 24, 2026

(54) IMAGE DISTORTION CALIBRATION DEVICE, DISPLAY DEVICE AND DISTORTION CALIBRATION METHOD

(71) Applicant: Samsung Display Co., LTD., Yongin-si (KR)

(72) Inventors: Cheon Myeong Lee, Yongin-si (KR); Sang Ho Kim, Yongin-si (KR); Soo Min Baek, Yongin-si (KR); Ju Youn Son, Yongin-si (KR); Ji Won Lee, Yongin-si (KR); Bek Hyun Lim, Yongin-si (KR); Ju Hwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 189 days.

(21) Appl. No.: 18/389,197

(22) Filed: Nov. 13, 2023

(65) Prior Publication Data

US 2024/0193813 A1    Jun. 13, 2024

(30) Foreign Application Priority Data

Dec. 12, 2022    (KR) ........................ 10-2022-0172502

(51) Int. Cl.
| | |
|---|---|
| G06T 7/80 | (2017.01) |
| G06T 5/80 | (2024.01) |
| G09G 3/00 | (2006.01) |
| H04N 17/00 | (2006.01) |

(52) U.S. Cl.
CPC .................. *G06T 7/80* (2017.01); *G06T 5/80* (2024.01); *G09G 3/001* (2013.01); *H04N 17/00* (2013.01); *G06T 2207/20021* (2013.01); *G09G 2320/0693* (2013.01)

(58) Field of Classification Search
None
See application file for complete search history.

(56) References Cited

U.S. PATENT DOCUMENTS

| | | | | |
|---|---|---|---|---|
| 5,686,960 A | * | 11/1997 | Sussman | ............... G06T 3/4038 |
| | | | | 382/284 |
| 2005/0083531 A1 | * | 4/2005 | Millerd | ..................... G06T 5/80 |
| | | | | 356/450 |
| 2012/0133765 A1 | * | 5/2012 | Matherson | ........... H04N 17/002 |
| | | | | 348/135 |
| 2019/0018216 A1 | * | 1/2019 | Fu | ...................... G02B 27/0179 |

FOREIGN PATENT DOCUMENTS

KR          102349765          1/2022

* cited by examiner

*Primary Examiner* — Yingchun He
(74) *Attorney, Agent, or Firm* — CANTOR COLBURN LLP

(57) ABSTRACT

A distortion calibration device includes an image acquisition unit which acquires a plurality of test images generated by capturing an image, which is displayed on a display panel, for each channel of the multi-channel lens by a camera and a plurality of reference images generated for each channel with respect to the multi-channel lens and the display panel, and a mapping data generator which acquires an error per channel between the plurality of test images and the plurality of reference images with respect to each channel and generates calibration data for compensating the error per channel to generate calibration mapping data based on reference mapping data and the calibration data.

20 Claims, 17 Drawing Sheets

LS1: LS11, LS12, LS13, LS14
LS2: LS21, LS22, LS23, LS24

LS1: LS11, LS12, LS13, LS14
LS2: LS21, LS22, LS23, LS24

LS1: LS11, LS12, LS13, LS14
LS2: LS21, LS22, LS23, LS24

No distortion          Barrel distortion          Pin-cushion distortion

LS1: LS11, LS12, LS13, LS14
LS2: LS21, LS22, LS23, LS24

IMAGE DISTORTION CALIBRATION DEVICE, DISPLAY DEVICE AND DISTORTION CALIBRATION METHOD

This application claims priority to Korean Patent Application No. 10-2022-0172502, filed on Dec. 12, 2022, and all the benefits accruing therefrom under 35 U.S.C. § 119, the content of which in its entirety is herein incorporated by reference.

BACKGROUND

1. Field

The disclosure relates to a distortion calibration device, a display device and a distortion calibration method.

2. Description of the Related Art

Among display devices, there are electronic devices provided in the form that can be worn on a body. These electronic devices are typically referred to as wearable devices. The wearable electronic device is directly worn on the body so that portability and accessibility of a user can be improved.

As an example of the wearable electronic device, there is a head mounted display (head mounted electronic device) which can be worn on a head portion or head of a wearer. The HMD can be largely categorized into a see-through type for providing augmented reality (AR) and a see-closed type for providing virtual reality (VR).

Such a head mounted display may adopt a multi-channel lens such as a lens array to reduce a thickness of an optical system.

SUMMARY

Embodiments of the disclosure is directed to a display device, a distortion calibration device and a distortion calibration method, in which geometric distortion generated by a multi-channel may be offset. The display device according to an embodiment may offset geometric distortion generated by a multi-channel lens.

According to an embodiment, a distortion calibration device of a multi-channel lens includes an image acquisition unit which acquires a plurality of test images generated by capturing an image, which is displayed on a display panel, for each channel of the multi-channel lens by a camera and a plurality of reference images generated for each channel with respect to the multi-channel lens and the display panel, and a mapping data generator which acquires an error per channel between the plurality of test images and the plurality of reference images with respect to each channel and generates calibration data for compensating the error per channel to generate calibration mapping data based on reference mapping data and the calibration data.

In an embodiment, the image acquisition unit may divide an eyebox of the display panel into 'n' number of sub-eyeboxes, move the camera to allow an optical axis of the camera to correspond to the sub-eyeboxes from 1 to 'n', and acquire a total of 'n'×'m' test images by capturing a test image for each of 'm' number of channels at each position of the camera by the camera.

In an embodiment, the image acquisition unit may acquire a total of 'n'×'m' reference images by a simulation for generating an image for each of the 'm' number of channels with respect to a position of a pupil gazing at the sub-eyeboxes from 1 to 'n'.

In an embodiment, The calibration data is generated by the following equation: Calibration data (offset data)=$f^{-1}(\Sigma$(Ref.Image$_{n,m}$–SourceImage$_{n,m}$)), where Ref.Image$_{n,m}$ denotes a reference image of an (m)th channel at a position of an (n)th sub-eyebox, SourceImage$_{n,m}$ denotes a test image of the (m)th channel at the position of the (n)th sub-eyebox, and $f^{-1}(\ )$ denotes an inverse function of a transfer function in which display information is transferred to an eyeball through a lens, where n is a variable positive integer ranging from 1 to 'n', and m is a variable positive integer ranging from 1 to 'm'.

In an embodiment, the reference mapping data may be generated by a simulation which calibrates chromatic aberration of the multi-channel lens.

In an embodiment, the image displayed on the display panel may include a pattern predetermined to estimate a position of the image displayed on the display panel.

In an embodiment, the pattern may include a colored dot or a grid.

In an embodiment, a channel other than a selected channel may be masked when a test image for the selected channel is captured at each camera position.

According to an embodiment, a display device includes a display panel which outputs light for display of an image, at least one multi-channel lens disposed on a light emitting path of the light from the display panel to provide a multi-channel, a memory which stores one or more instructions and a processor which executes the one or more instructions stored in the memory, where the processor executes the one or more instructions to generate an output image by applying calibration mapping data to an original image and provides the output image to the display panel, and the calibration mapping data is generated based on calibration data for compensating an error for each channel provided by the multi-channel lens.

In an embodiment, the calibration data may be generated to compensate an error per channel between a plurality of test images generated by capturing the image, which is displayed on the display panel, for each channel of the multi-channel lens by a camera and a plurality of reference images generated for each channel with respect to the multi-channel lens and the display panel.

In an embodiment, the plurality of test images may be a total of 'n'×'m' number of test images, the plurality of reference images may be a total of 'n'×'m' number of reference images, each of 'n' and 'm' is a natural number, the 'n' is a total number of sub-eyeboxes generated by dividing an eyebox of the display panel, and the 'm' is a total number of channels of the multi-channel lens.

In an embodiment, the calibration data may be generated by the following equation: Calibration data (offset data)=$f^{-1}(\Sigma$(Ref.Image$_{n,m}$–SourceImage$_{n,m}$)), where Ref.Image$_{n,m}$ denotes a reference image of an (m)th channel at a position of an (n)th sub-eyebox, SourceImage$_{n,m}$ denotes a test image of the (m)th channel at the position of the (n)th sub-eyebox, and $f^{-1}(\ )$ denotes an inverse function of a transfer function in which display information is transferred to an eyeball through a lens, where n is a variable positive integer ranging from 1 to 'n', and m is a variable positive integer ranging from 1 to 'm'

In an embodiment, the calibration mapping data may be generated based on the calibration data and reference mapping data, and the reference mapping data may be generated by a simulation which calibrates chromatic aberration of the multi-channel lens.

According to an embodiment, a distortion calibration method includes acquiring a plurality of test images generated by capturing an image, which is displayed on a display panel by passing through the multi-channel lens, for each channel by a camera and a plurality of reference images generated for each channel with respect to the multi-channel lens and the display panel, acquiring an error per channel between the plurality of test images and the plurality of reference images with respect to each channel and generating calibration data for compensating the error per channel, and generating calibration mapping data based on reference mapping data and the calibration data.

According to an embodiment, the acquiring the plurality of test images and the plurality of reference images generated for each channel with respect to the multi-channel lens and the display panel may include dividing an eyebox of the display panel into 'n' number of sub-eyeboxes, moving the camera to allow an optical axis of the camera to correspond to the sub-eyeboxes from 1 to 'n', acquiring a total of 'n'×'m' test images by capturing a test image for each of 'm' number of channels at each position of the camera by the camera, and acquiring a total of 'n'×'m' reference images by a simulation for generating an image for each of the 'm' number of channels with respect to a position of a pupil gazing at the sub-eyeboxes from 1 to 'n'.

According to an embodiment, the calibration data may be generated by the following equation: Calibration data (offset data)$=f^{-1}(\Sigma(\text{Ref.Image}_{n,m}-\text{SourceImage}_{n,m}))$, where Ref.Image$_{n,m}$ denotes a reference image of an (m)th channel at a position of an (n)th sub-eyebox, SourceImage$_{n,m}$ denotes a test image of the (m)th channel at the position of the (n)th sub-eyebox, and $f^{-1}(\ )$ denotes an inverse function of a transfer function in which display information is transferred to an eyeball through a lens, where n is a variable positive integer ranging from 1 to 'n', and m is a variable positive integer ranging from 1 to 'm'.

In an embodiment, the acquiring the plurality of test images and the plurality of reference images generated for each channel with respect to the multi-channel lens and the display panel may include masking a channel other than a (k)th channel when a test image for the (k)th channel is captured at each camera position.

In an embodiment, the reference mapping data may be generated by a simulation which calibrates chromatic aberration of the multi-channel lens.

In an embodiment, the image displayed on the display panel may include a pattern predetermined to estimate a position of the image displayed on the display panel.

In an embodiment, the pattern may include a colored dot or a grid.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
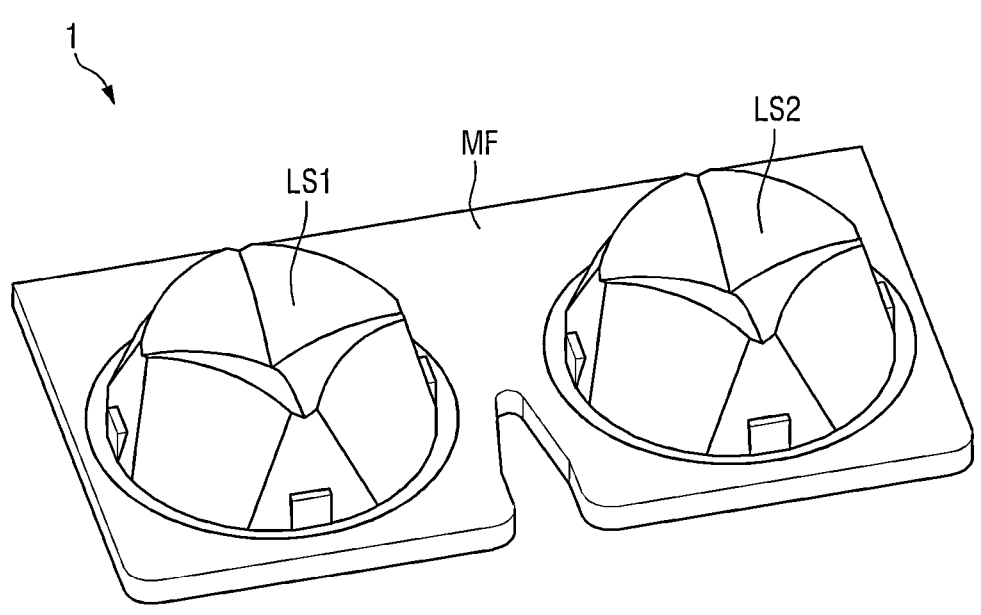
FIG. 1 is a perspective view illustrating a display device according to an embodiment.
Figure 1:
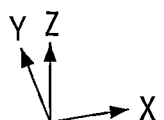

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
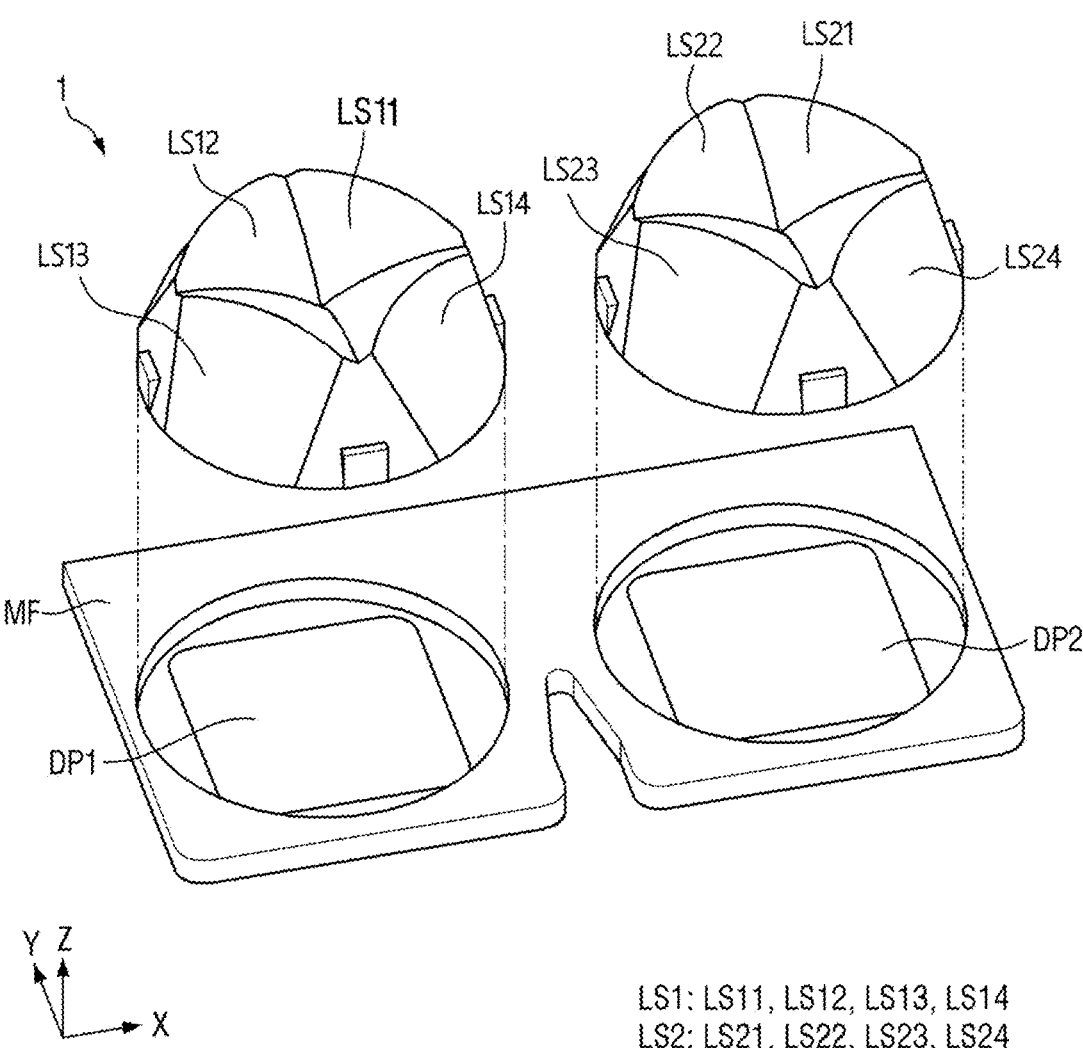
FIG. 2 is an exploded perspective view illustrating a display device according to an embodiment.

FIG. 1 is a perspective view illustrating a display device according to an embodiment. FIG. 2 is an exploded perspective view illustrating a display device according to an embodiment.

In the following description, a first direction X, a second direction Y and a third direction Z cross one another in different directions. For example, the first direction X may be a length direction, the second direction Y may be a width direction, and the third direction Z may be a thickness direction. The third direction Z may be a direction in which an eyeball of a user is located or a direction in which images of a first display panel DP1 and a second display panel DP2, which will be described later, are displayed. However, the directions should be understood to be relative, and are not limited to the above examples.

Hereinafter, an embodiment where a display device 1 is a head mounted display device mounted on a user's head to provide a screen on which an image or a video is displayed to a user will be described in detail.

The head mounted display device may include a see-through type for providing augmented reality based on actual external objects and a see-closed type for providing virtual reality to a user as a screen independent of an external object. Hereinafter, embodiments where the head mounted display device is a see-closed type head mounted display device will be described in detail by way of example, but is not limited thereto.

Referring to FIGS. 1 and 2, an embodiment of the display device 1 may include a main frame MF, a first display panel DP1, a second display panel DP2, a first multi-channel lens LS1 and a second multi-channel lens LS2.

The main frame MF may be worn on a user's head (or face). The main frame MF may have a shape corresponding to a shape of the user's head (or face). In an embodiment, the main frame MF may have a shape similar to that of glasses, but is not limited thereto.

The main frame MF may package the first display panel DP1, the second display panel DP2, the first multi-channel lens LS1 and the second multi-channel lens LS2 therein. In some embodiments, the main frame MF may further include a structure such as a strap or band to facilitate mounting.

The first display panel DP1 and the second display panel DP2 display images and/or videos. Light for providing images and/or videos may be emitted from the first display panel DP1 and the second display panel DP2.

The first display panel DP1 and the second display panel DP2 may be provided in a state that the first display panel DP1 and the second display panel DP2 are fixed to the main frame MF, or may be detachably provided. The first display panel DP1 and the second display panel DP2 may be configured to be opaque, transparent or translucent depending on the design of the display device 1, for example, the type of the display device 1.

The first display panel DP1 and the second display panel DP2 may be light emitting display panels including a light emitting element. In an embodiment, for example, the display panel may include an organic light emitting display panel using an organic light emitting diode including an organic light emitting layer, a micro light emitting diode (LED) display panel using a micro LED, a quantum dot light emitting display panel using a quantum dot LED including a quantum dot light emitting layer or an inorganic light emitting display panel using an inorganic light emitting element including an inorganic semiconductor, but is not limited thereto.

In an embodiment, two display panels DP1 and DP2 spaced apart from each other to correspond to both eyes of a user are provided to the display device 1, but are not limited thereto. In some embodiments, the first display panel DP1 and the second display panel DP2 may be replaced with one display panel disposed to overlap the first multi-channel lens LS1 and the second multi-channel lens LS2.

The first multi-channel lens LS1 and the second multi-channel lens LS2 may allow light emitted from the first display panel DP1 or the second display panel DP2 to pass therethrough to provide the light to the user.

The first multi-channel lens LS1 and the second multi-channel lens LS2 may reflect and/or refract the light emitted from the first display panel DP1 and the second display panel DP2 to provide the light to the user. The first multi-channel lens LS1 and the second multi-channel lens LS2 may provide a plurality of channels through which the light emitted from the first display panel DP1 and the second display panel DP2 passes. The light emitted from the first display panel DP1 and the second display panel DP2 may pass through different paths of the plurality of channels to provide the light to the user. The light emitted from the first display panel DP1 and the second display panel DP2 may be incident on each channel so that an enlarged image may be focused on the user's eyes. The plurality of channels may be implemented by a plurality of sub-lenses LS11, LS12, LS13, LS14, LS21, LS22, LS23 and LS24 that will be described later.

The first multi-channel lens LS1 may be disposed on (or to overlap) the first display panel DP1, and the second multi-channel lens LS2 may be disposed on the second display panel DP2. The first multi-channel lens LS1 and the second multi-channel lens LS2 may be disposed at positions corresponding to the user's left and right eyes.

Although not shown, an embodiment of the display device 1 may further include a controller for controlling the overall operation of the display device 1.

In an embodiment, the controller may be configured to be communicatively connected to a display driving circuit included in the display panel and to provide signals, information and/or data to the display driving circuit. The signals, information and/or data received by the display drive circuit may allow the display driver circuit to illuminate light emitting elements in a particular manner. That is, a display controller(s) may determine which light emitting element(s)

will be illuminated, when the element(s) is(are) illuminated and an output level of the light to be emitted by the light emitting element(s). Accordingly, in such an embodiment, the display controller(s) may communicate appropriate signals, information and/or data to the display drive circuit. The controller may be implemented as a dedicated processor that includes an embedded processor, and/or a general-purpose processor that includes a central processing unit or an application processor, but is not limited thereto.

Figure 3:
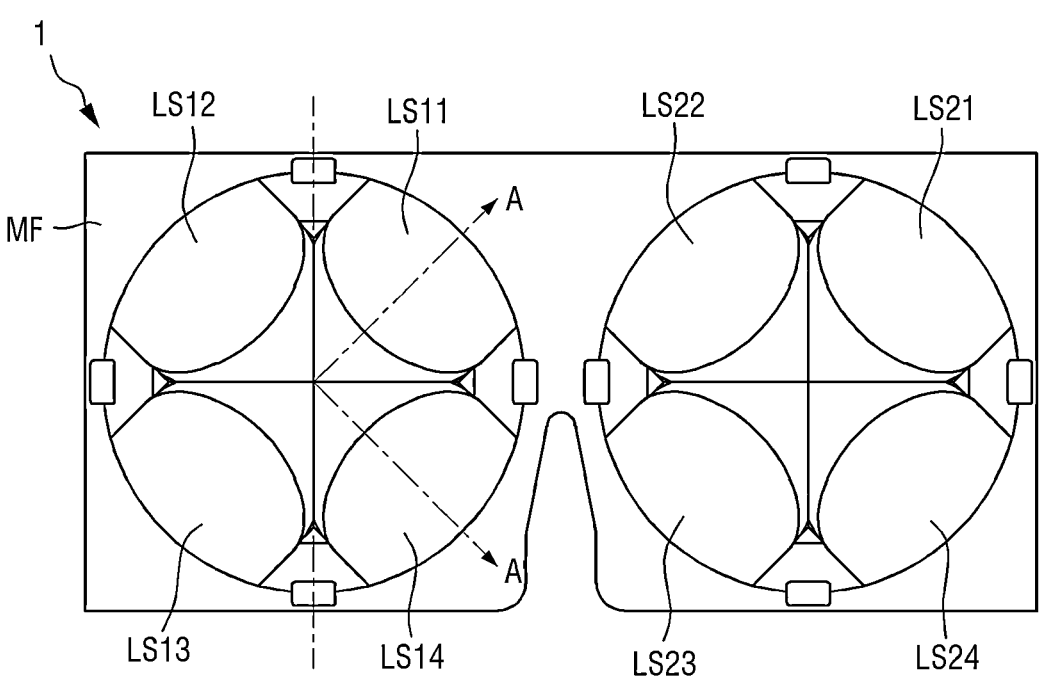
FIG. 3 is a plan view illustrating a display device according to an embodiment.
Figure 4A:
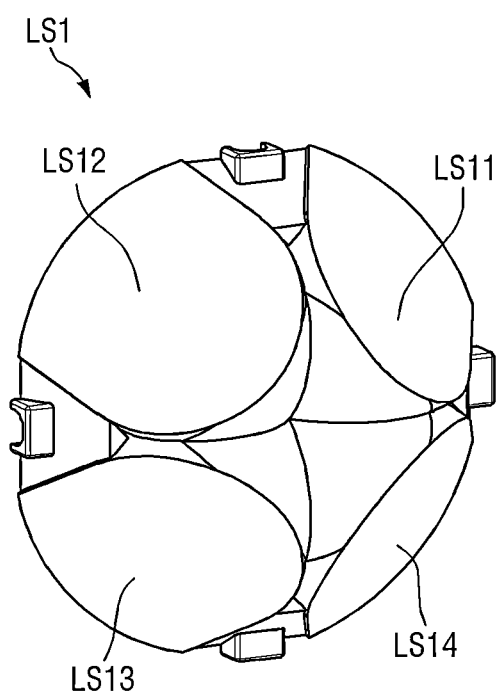
FIG. 4A is a detailed one-side perspective view illustrating a multi-channel lens shown in FIGS. 1 and 3.

FIG. 3 is a plan view illustrating a display device according to an embodiment. FIG. 4A is a detailed one-side (or front) perspective view illustrating a multi-channel lens shown in FIGS. 1 and 3, and FIG. 4B is a detailed other-side (or rear) perspective view illustrating a multi-channel lens shown in FIGS. 1 and 3.

Figure 4B:
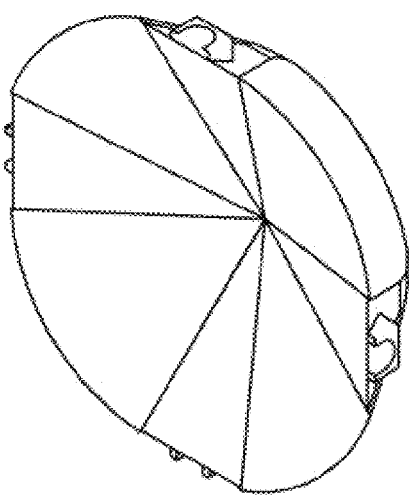
FIG. 4B is a detailed other-side perspective view illustrating a multi-channel lens shown in FIGS. 1 and 3.

Referring to FIG. 3, FIG. 4A and FIG. 4B, the first and second multi-channel lenses LS1 and LS2 are disposed on a front surface of the main frame MF, and may be disposed at points corresponding to a user's both eyes. In an embodiment, for example, the main frame MF has a generally rectangular shape elongated in a first direction (horizontal direction in FIG. 3) on a plane, and the first multi-channel lens LS1 may be disposed on the first display panel (DP1 in FIG. 2) on a front surface of one side of the main frame MF, that is, a front surface of the display panel (DP1 in FIG. 2). The second multi-channel lens LS2 may be disposed on the second display panel (DP2 in FIG. 2), that is, on a front surface of the second display panel (DP2 of FIG. 2).

In an embodiment, the first and second multi-channel lenses LS1 and LS2 are disposed to be symmetrical based on a center of the main frame MF, and the first and second multi-channel lenses LS1 and LS2 may have substantially the same or similar structure as each other, but are not limited thereto.

The first and second multi-channel lenses LS1 and LS2 may include a plurality of sub-lenses LS11, LS12, LS13, LS14, LS21, LS22, LS23 and LS24.

In an embodiment, the first multi-channel lens LS1 may include a first sub-lens LS11, a second sub-lens LS12, a third sub-lens LS13 and a fourth sub-lens LS14. The second multi-channel lens LS2 may include a fifth sub-lens LS21, a sixth sub-lens LS22, a seventh sub-lens LS23 and an eighth sub-lens LS24. However, the number of the plurality of sub-lenses LS11, LS12, LS13, LS14, LS21, LS22, LS23 and LS24 is not limited to the above example.

In an embodiment, since the second multi-channel lens LS2 is substantially the same as or similar to the first multi-channel lens LS1, the following description will be based on the first multi-channel lens LS1, and any repetitive detailed description of the second multi-channel lens LS2 may be omitted or simplified.

In an embodiment, as shown in FIG. 3, the first multi-channel lens LS1 may have an approximately circular shape on a plane. The first sub-lens LS11, the second sub-lens LS12, the third sub-lens LS13 and the fourth sub-lens LS14 may be disposed in a clover shape to surround the center of the circular shape on the plane. In an embodiment, for example, as shown in FIG. 3, the first sub-lens LS11, the second sub-lens LS12, the third sub-lens LS13 and the fourth sub-lens LS14 may be disposed at upper right, upper left, lower left and lower right sides based on the center of the first multi-channel lens LS1, respectively. The first sub-lens LS11, the second sub-lens LS12, the third sub-lens LS13 and the fourth sub-lens LS14 may be integrally connected to one another, that is, integrally formed as a single unitary and indivisible part, or may be separated from one another.

In more detail, FIG. 4A is a perspective view illustrating one side of the first multi-channel lens LS1 facing the user's eyes. Further, FIG. 4B is a perspective view illustrating the other side of the first multi-channel lens LS1 facing an image display surface of the first display panel (DP1 in FIG. 2).

Referring to FIGS. 4A and 4B, in an embodiment, a cross-section of the first multi-channel lens LS1 may be formed in an approximate hemispherical shape. In such an embodiment, one side of the first multi-channel lens LS1 facing the main frame MF or the user's eyes may be formed in a convex shape, and the other side of the first multi-channel lens LS1 opposite to the first display panel DP1 may be formed in a concave shape.

A cross-section of the second multi-channel lens LS2 is also formed in an approximate hemispherical shape, and the fifth sub-lens LS21, the sixth sub-lens LS22, the seventh sub-lens LS23 and the eighth sub-lens LS24 may be disposed in a circular shape or a clover shape to surround the center of the second multi-channel lens LS2 on the plane.

Figure 5:
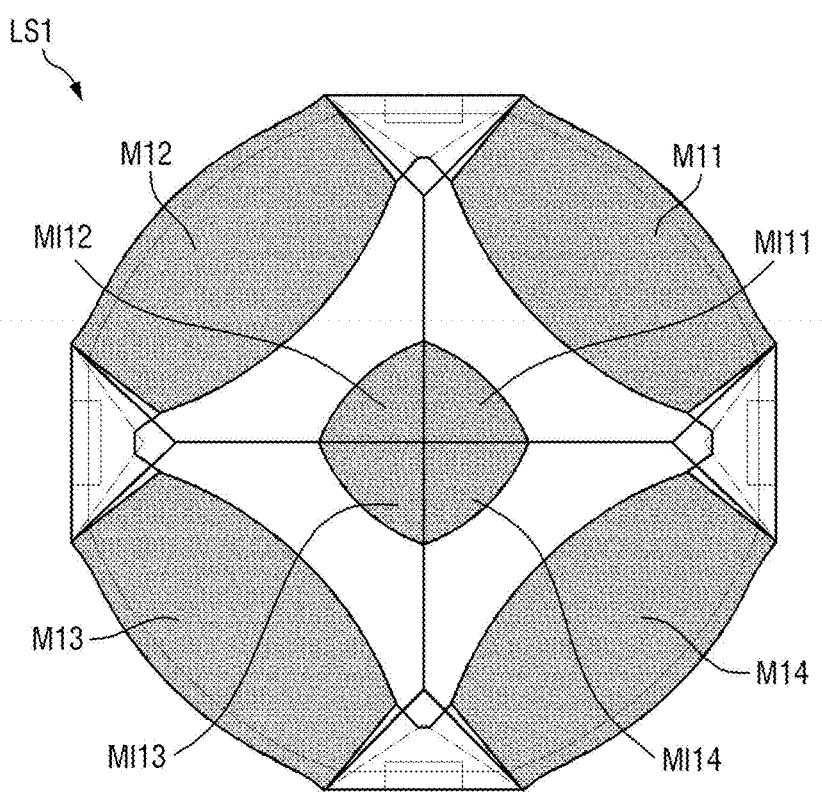
FIG. 5 is a detailed front view illustrating mirror coating areas of the multi-channel lens shown in FIGS. 4A and 4B.
Figure 6:
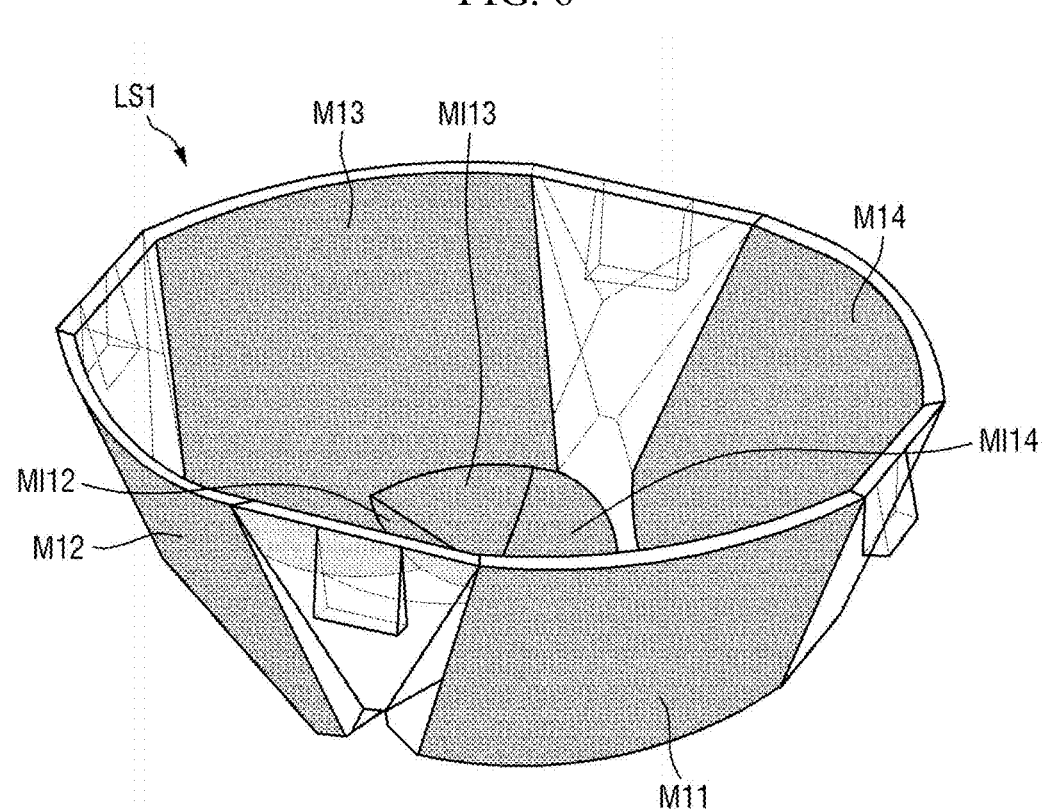
FIG. 6 is a detailed rear perspective view illustrating mirror coating areas of the multi-channel lens shown in FIGS. 4A and 4B.

FIG. 5 is a detailed front view illustrating mirror coating areas of the multi-channel lens shown in FIGS. 4A and 4B, and FIG. 6 is a detailed rear perspective view illustrating mirror coating areas of the multi-channel lens shown in FIGS. 4A and 4B.

Referring to FIGS. 5 and 6, in an embodiment, front surfaces or rear surfaces of first to fourth sub-lenses LS11, LS12, LS13 and LS14 formed in the first multi-channel lens LS1 may be mirror coating areas. In such an embodiment, a reflective material may be formed or coated on first to fourth mirror coating areas M11, M12, M13 and M14 distinguished in the first to fourth sub-lenses LS11, LS12, LS13 and LS14.

The first to fourth mirror coating areas M11, M12, M13 and M14, which are distinguished from each of the first to fourth sub-lenses LS11, LS12, LS13 and LS14, face a concave shape portion of the first multi-channel lens LS1, which is the central portion of the first multi-channel lens LS1. Therefore, the first to fourth mirror coating areas M11, M12, M13 and M14 may reflect image display light incident from the rear surface of the first multi-channel lens LS1 toward the concave shape portion, which is the central portion of the first multi-channel lens LS1.

In an embodiment, first to fourth inner coating areas MI11, MI12, MI13 and MI14 facing the first to fourth mirror coating areas M11, M12, M13 and M14 are defined in the concave shape portion that is the central portion of the first multi-channel lens LS1 and is also the rear surface of the first multi-channel lens LS1. In such an embodiment, a reflective material is formed or coated even in the first to fourth inner coating areas MI11, MI12, MI13 and MI14 in the same manner as the first to fourth mirror coating areas M11, M12, M13 and M14. Therefore, the first to fourth inner coating areas MI11, MI12, MI13 and MI14 may reflect the image display light reflected from the first to fourth mirror coating areas M11, M12, M13 and M14 toward the user's eyeball direction that is a front direction.

The formation structure of the first to fourth mirror coating areas M11, M12, M13 and M14 and the first to fourth inner coating areas MI11, M112, M113 and MI14 of the first multi-channel lens LS1 is equally applied to the second multi-channel lens LS2.

Figure 7:
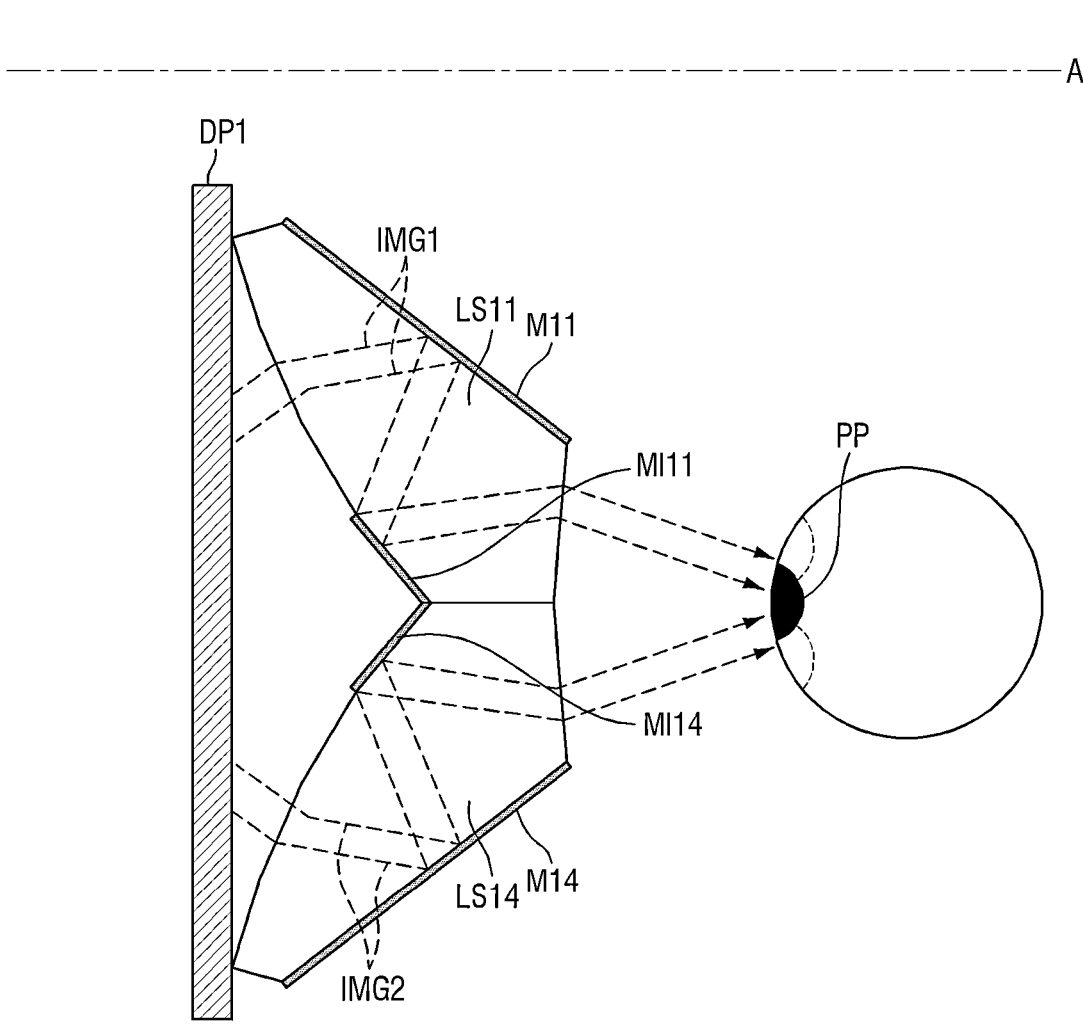
FIG. 7 is a detailed cross-sectional view taken along line A-A' of a display device shown in FIG. 3.

FIG. 7 is detailed a cross-sectional view taken along line A-A' of a display device shown in FIG. 3.

When the user forward gazes at the first and second display panels DP1 and DP2 through the first and second multi-channel lenses LS1 and LS2, the first and second display panels DP1 and DP2 display a display image corresponding to a direction of the user's front pupil PP.

Referring to FIG. 7, the plurality of sub-lenses LS11, LS12, LS13 and LS14 respectively formed or defined in the first multi-channel lens LS1 provide a plurality of channels through which light emitted from the front surface of the first display panel DP1 passes. The image display light emitted from different areas of the front surface of the first display panel DP1 may pass through the respective channels through different paths. In this case, the image display light may include a partial video and/or partial image for configuring one complete VR image.

In an embodiment, for example, as shown in FIG. 7, the first sub-lens LS11 may provide a channel through which image display light IMG1 emitted from one area (e.g., upper end of the first display panel DP1) of the first display panel DP1 passes, and the fourth sub-lens LS14 may provide a channel through which image display light IMG2 emitted from the other area (e.g., lower end of the first display panel DP1) of the first display panel DP1 passes. One area and the other area of the first display panel DP1 may include an area overlapped with the first sub-lens LS11 and an area overlapped with the fourth sub-lens LS14, respectively.

In an embodiment, although not shown, each of the second sub-lens LS12 and the third sub-lens LS13 may provide a channel through which light emitted from different areas of the display panel DP passes.

In an embodiment, the image display light passing through each of the sub-lenses LS11, LS12, LS13 and LS14 may be provided to the user through reflection of two times by the first to fourth mirror coating areas M11, M12, M13 and M14 and the first to fourth inner coating areas MITT, MI12, MI13 and MI14, but is not limited thereto.

Figure 8:
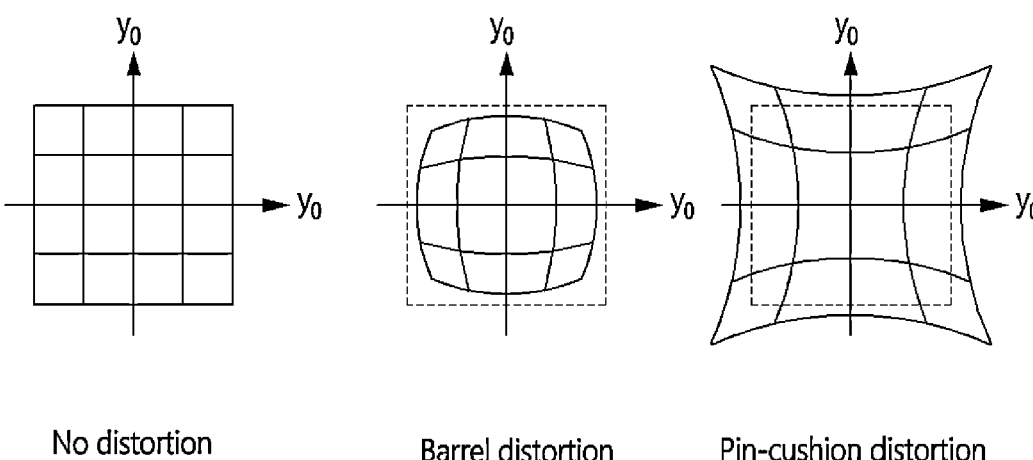
FIG. 8 is a view illustrating distortion of a display device having a single channel lens.

FIG. 8 is a view illustrating distortion of a display device having a single channel lens.

Referring to FIG. 8, 'no distortion', 'barrel distortion', and 'pin-cushion distortion' are shown sequentially as an example.

Geometric distortion may exist in an image displayed on the display device having a single channel lens by the single channel lens. The geometric distortion is generated by a lens for refracting light output from the display device, and may be strongly represented toward the periphery of the image. This geometric distortion may be different depending on lens characteristics.

In a case where an original image having no distortion is displayed on the display device, light emitted from the display device has geometric distortion while passing through the single channel lens.

Examples of the geometric distortion include barrel distortion and pin-cushion distortion.

The barrel distortion is a distortion in which image magnification is reduced toward the periphery of the image, and may be bent like a circle toward the periphery, and may be generated by, for example, a wide-angle lens. In FIG. 8, an example of barrel distortion may case a horizontal line positioned at the center and represented in a straight line to be bent like a circle toward the upper or lower periphery. Likewise, in FIG. 8, a vertical line is bent like a circle toward the left or right periphery.

The pin-cushion distortion is a distortion in which image magnification is increased toward the periphery of the image, and may be bent in a direction opposite to barrel distortion toward the periphery of the image, and may be generated by, for example, a telephoto lens. In FIG. 8, an example of pin-cushion distortion may cause a horizontal line positioned at the center represented in a straight line to cause its center to be bent in an inward direction, which is a central direction of the image, toward the upper or lower periphery. In FIG. 8, a center of a vertical line is bent in an inward direction toward the left or right periphery.

The barrel distortion or pin-cushion distortion may be relatively easily resolved by various calibration methods that are previously known.

Figure 9:
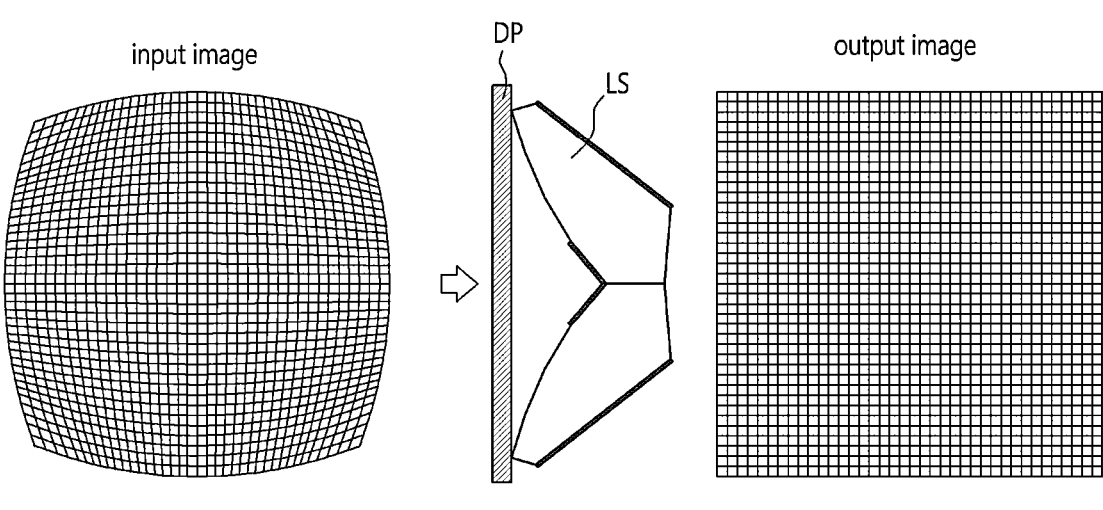
FIG. 9 is a view illustrating calibration of pin-cushion distortion of a display device.
Figure 10:
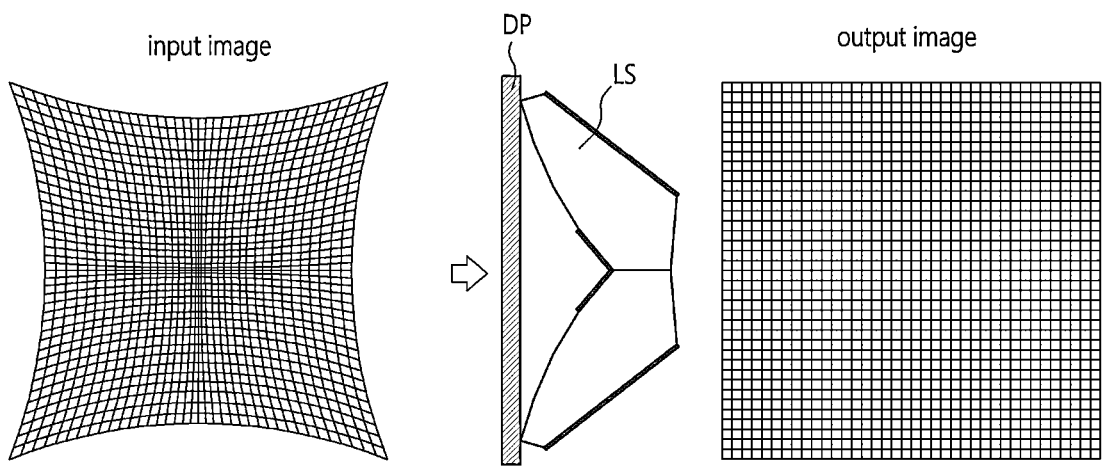
FIG. 10 is a view illustrating calibration of barrel distortion of a display device.

FIG. 9 is a view illustrating calibration of pin-cushion distortion of a display device. FIG. 10 is a view illustrating calibration of barrel distortion of a display device.

Referring to FIG. 9, an original image displayed on the display device may have pin-cushion distortion while passing through a lens.

When an input image displayed on a display panel is projected onto a multi-channel lens LS to represent pin-cushion distortion, a calibration image obtained by allowing the original image to be intentionally subjected to barrel distortion is generated. When the generated calibration image is output from the display panel DP, the pin-cushion distortion may be offset from the output image projected through the multi-channel lens LS.

Similarly, referring to FIG. 10, an original image displayed on the display device may have barrel distortion while passing through a lens.

When the input image displayed on the display panel is projected onto the multi-channel lens LS to represent barrel distortion, a calibration image obtained by allowing the original image to be intentionally subjected to pin-cushion distortion is generated. When the generated calibration image is output from the display panel DP, the barrel distortion may be offset from the output image projected through the multi-channel lens LS.

However, in case of the multi-channel lens, since one lens has multiple channels, distortion generated for each channel may be added to generate complex distortion. It may not be easy to generate a calibration image for compensating for the complex distortion.

In an embodiment, a calibration value is obtained for each channel with respect to distortion generated in the display device having a multi-channel lens, and a calibration image reflecting the calibration value for each channel is generated. The complex distortion generated by the multi-channel lens may be calibrated based on the generated calibration image.

Figure 11:
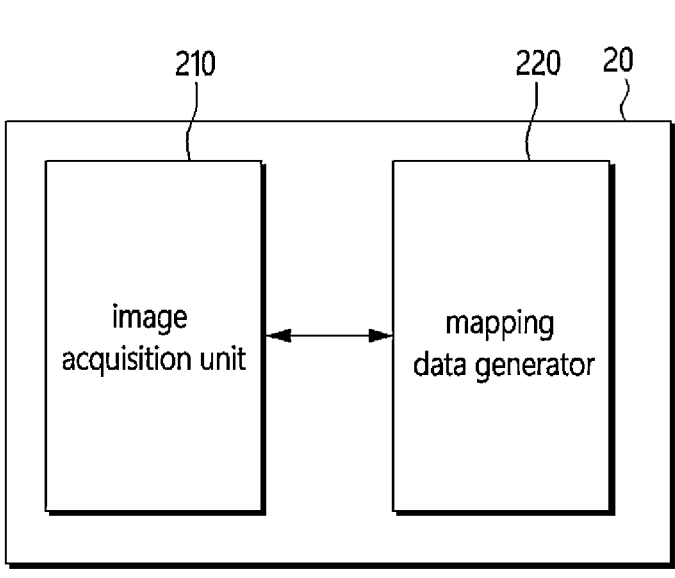
FIG. 11 is a block view illustrating a configuration of a distortion calibration device of a multi-channel lens according to an embodiment.
Figure 12:
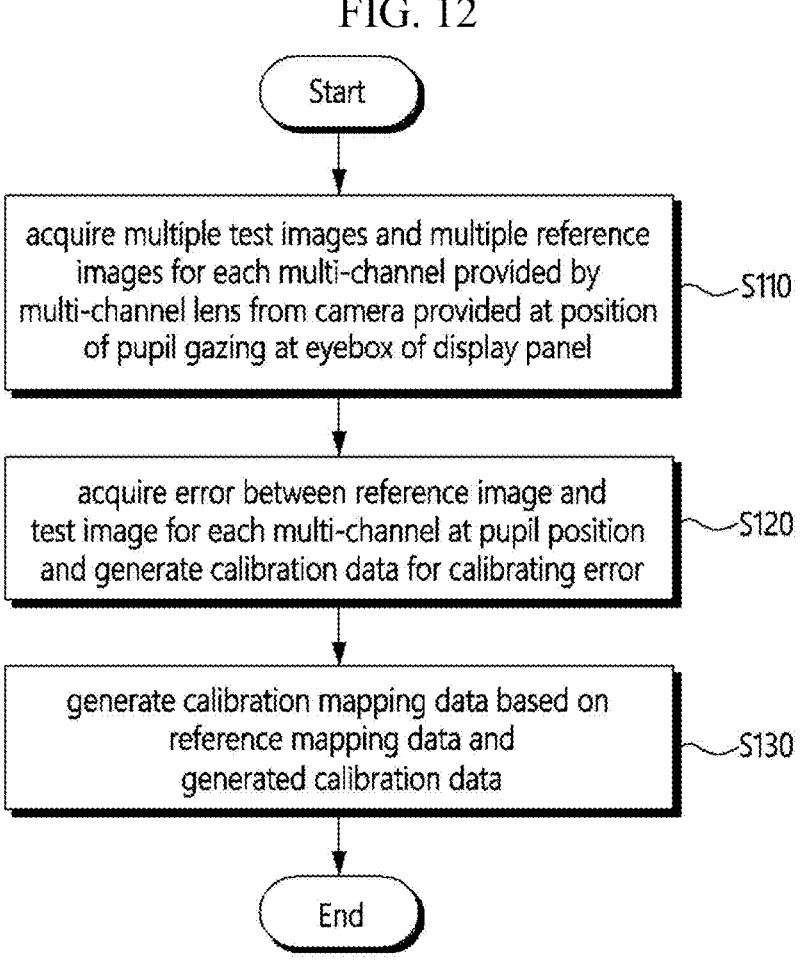
FIG. 12 is a flow chart illustrating a distortion calibration method of a multi-channel lens according to an embodiment.
Figure 13:
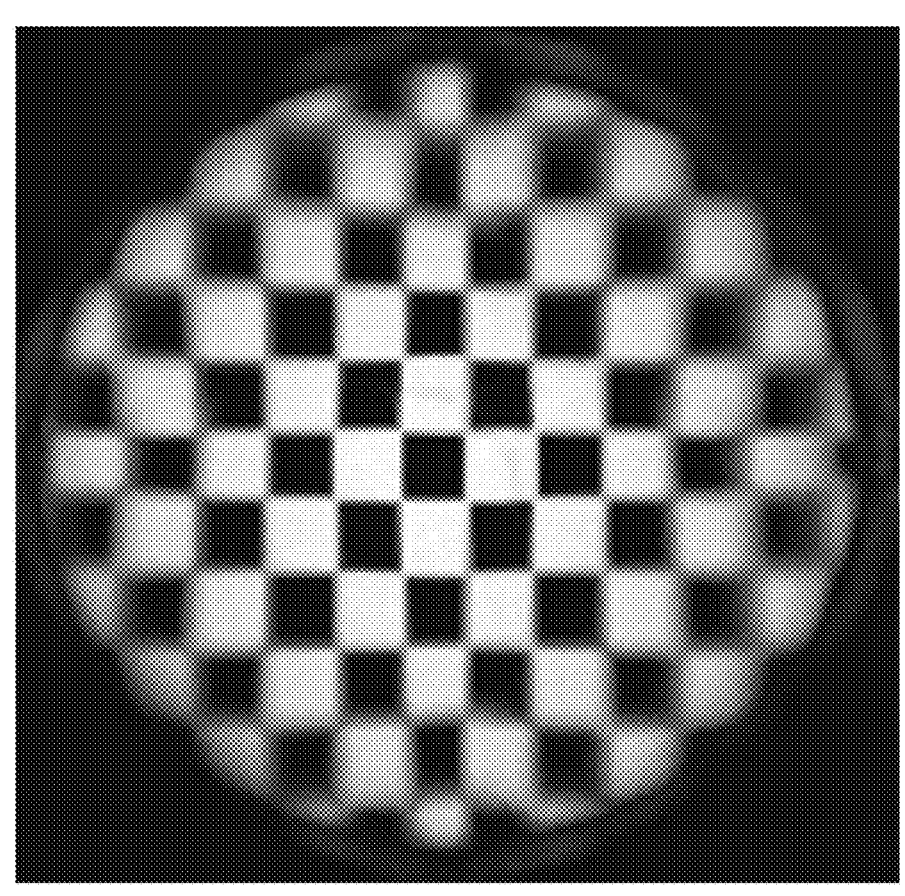
FIG. 13 is a view illustrating an example of a reference display pattern according to an embodiment.

FIG. 11 is a block view illustrating a configuration of a distortion calibration device of a multi-channel lens according to an embodiment, and FIG. 12 is a flow chart illustrating a distortion calibration method of a multi-channel lens according to an embodiment. FIG. 13 is a view illustrating an example of a reference display pattern according to an embodiment.

An embodiment of the distortion calibration method of the multi-channel lens in FIG. 12 may be executed by an embodiment of a distortion calibration device 20 of the multi-channel lens in FIG. 11. The display panel and the multi-channel lens, which are specified in FIGS. 11 and 12, may be the display panel and the multi-channel lens, which are described with reference to FIGS. 1 to 10.

Referring to FIG. 11, an embodiment of the distortion calibration device 20 of the display device may include an image acquisition unit 210 and a mapping data generator 220.

In process S110 in FIG. 12, the image acquisition unit 210 acquires a plurality of test images for each channel provided by a multi-channel lens and a plurality of reference images corresponding to the test image from a camera provided by dashing a pupil gazing at an eyebox.

In this case, the eyebox refers to an area in which an image output from the display panel DP and projected through the multi-channel lens may be clearly maintained.

That is, since the image is seen to be distorted when the position of the projected image is out of the eyebox, the display device generally moves the position of the projected image only within the eyebox. The size, shape, position, etc. of such eyebox are generally determined by a lens included in the optical system. That is, the size, shape, position, etc. of the eyebox are determined depending on the size, installation position, curvature, etc. of the multi-channel lens.

In an embodiment, the image acquisition unit 210 reproduces an original image, which includes a reference display pattern, on the display panel. The reference display pattern is a pattern determined to estimate a position of distortion on the display panel, and may be formed of, for example, a colored dot pattern or a grid pattern.

Next, the image acquisition unit 210 divides the eyebox of the display panel into 'n' number of sub-eyeboxes and moves the camera so that an optical axis of the camera corresponds to the sub-eyeboxes from 1 to 'n', that is, from a first sub-eyebox to ('n')th sub-eyebox. The image acquisition unit 210 acquires a test image captured for each of 'm' number of channels at each position of the camera. The image acquisition unit 210 acquires a total of 'n'×'m' test images. Here, each of 'n' and 'm' is a natural number.

In such an embodiment, the image acquisition unit 210 acquires a total of 'n'×'m' reference images by a simulation for generating an image for each of the 'm' number of channels with respect to a position of a pupil gazing at the sub-eyeboxes from 1 to 'n'. A simulation tool for generating a reference image may adopt any one of optical simulation tools, such as code V, LightTools, Virtual Lab and FDTD, which are conventionally known in the art.

In process S120 shown in FIG. 12, the mapping data generator 220 calculates an error per channel between the plurality of test images and the plurality of reference images with respect to each channel provided by the multi-channel lens, and generates calibration data for calibrating the error.

When the test image of the (m)th channel at the position of the (n)th sub-eyebox is referred to as SourceImage$_{n,m}$ and the reference image of the (m)th channel at the position of the (n)th sub-eyebox is referred to as Ref.Image$_{n,m}$, the calibration data is generated by the following Equation 1.

$$\text{Calibration data(offset data)} = f^{-1}(\Sigma(\text{Ref.Image}_{n,m} - \text{SourceImage}_{n,m})) \qquad \text{[Equation 1]}$$

In the Equation 1, $f^{-1}(\ )$ denotes an inverse function of a transfer function in which display information is transferred to the eyeball through the lens. In Equation 1, n is a variable positive integer ranging from 1 to 'n' and m is a variable positive integer ranging from 1 to 'm'.

Further, reference mapping data is generated by a simulation for calibrating chromatic aberration of the multi-channel lens. In an embodiment, the simulation is executed by the same tool as that of the simulation for generating the plurality of reference images in process S110.

In process S130 shown in FIG. 12, the mapping data generator 220 generates calibration mapping data based on the reference mapping data and the generated calibration data.

When the reference mapping data is referred to as Ref. Mapping and the calibration data is referred to as offset data, the calibration mapping data Mapping data may be obtained as in Equation 2.

$$\text{Mapping data} = \text{Ref.Mapping} + \text{offsetdata} \qquad \text{[Equation 2]}$$

The calibration mapping data generated by an embodiment means a calibration value for each channel with respect to channel distortion generated in the display device having a multi-channel lens. An intentional distortion is included in the calibration image to which the generated calibration mapping data is applied, and the intentional distortion may offset geometric distortion generated by the multi-channel lens.

Figure 14:
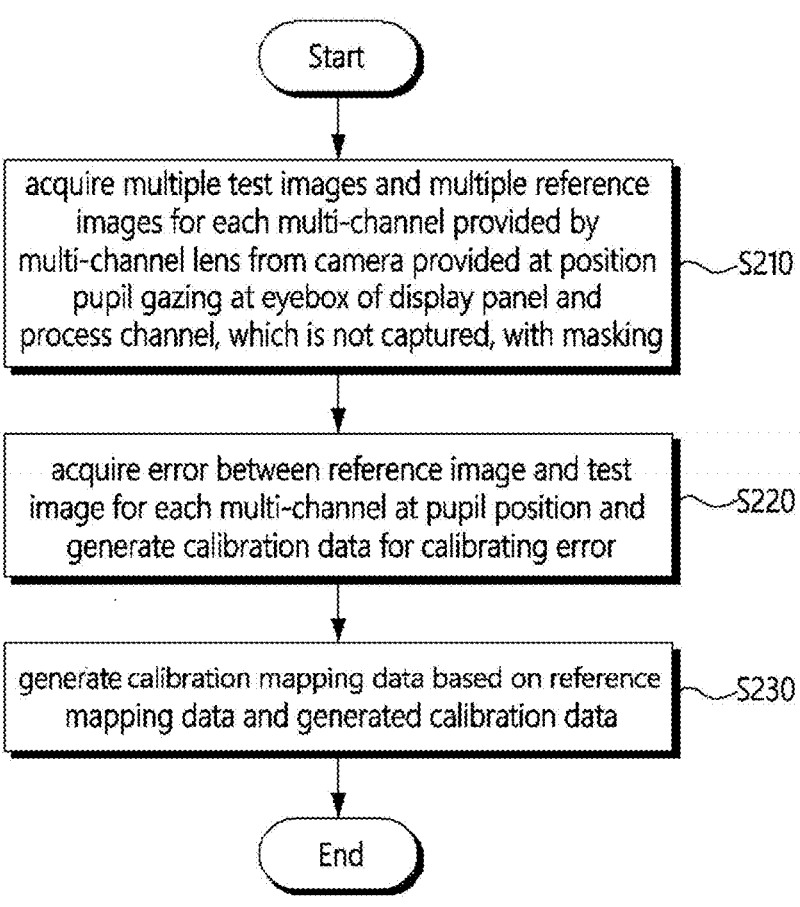
FIG. 14 is a flow chart illustrating a distortion calibration method of a multi-channel lens according to an alternative embodiment.
Figure 15:
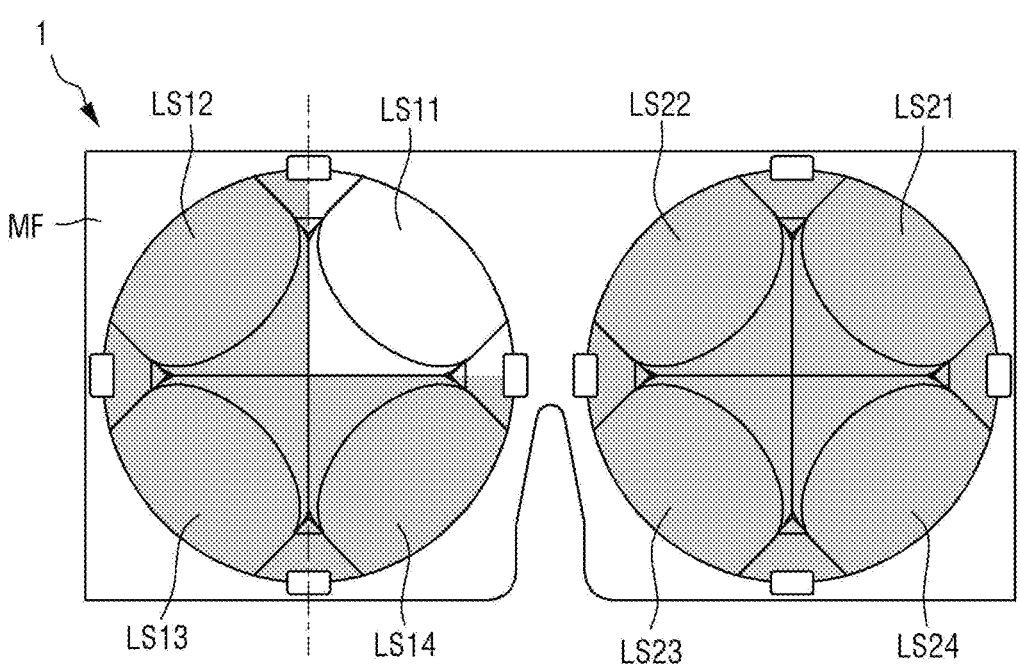
FIG. 15 is a view illustrating masking of a multi-channel lens according to an embodiment.

FIG. 14 is a flow chart illustrating a distortion calibration method of a multi-channel lens according to an alternative embodiment, and FIG. 15 is a view illustrating masking of a multi-channel lens according to an embodiment.

An embodiment of the distortion calibration method of the multi-channel lens in FIG. 14 may be executed by an embodiment of the distortion calibration device 20 of the multi-channel lens in FIG. 11. The display panel and the multi-channel lens, which are specified in FIGS. 11 and 12, may be the display panel and the multi-channel lens, which are described with reference to FIGS. 1 to 10. FIG. 15 is a view illustrating masking in the display device 1 of FIG. 3, and the same reference numerals in FIG. 15 as those of FIG. 3 refer to the same elements as those of FIG. 3 and any repetitive detailed description thereof will be omitted.

In process S210, the image acquisition unit 210 acquires a plurality of test images for each channel provided by the multi-channel lens and a plurality of reference images corresponding to the test images from a camera provided by dashing a pupil gazing at an eyebox.

In an embodiment, the image acquisition unit 210 reproduces an original image including a reference display pattern on the display panel. The reference display pattern is a pattern determined to estimate the position of distortion on the display panel, and may be a grid pattern or the like, for example, as shown in FIG. 13. As another example, the reference display pattern may be a colored dot pattern.

Next, the image acquisition unit 210 divides the eyebox of the display panel into 'n' number of sub-eyeboxes and moves a camera so that an optical axis of the camera corresponds to the sub-eyeboxes from 1 to 'n'. The image acquisition unit 210 acquires a test image captured for each of 'm' number of channels at each position of the camera. The image acquisition unit 210 acquires a total of 'n'×'m' test images. In this case, channels other than a channel, which is a capturing target of the test image, are processed with masking. Referring to FIG. 14, channels of other sub-lenses LS12, LS13, LS14, LS21, LS22, LS23 and LS24 except for a first channel provided from the first sub-lens LS11 of the first multi-channel lens LS1 are covered with a material, through which light cannot pass, and then are processed with masking. A test image is captured through the first channel provided from the first sub-lens LS11 that is not processed with masking. Afterwards, the other sub-lenses LS11, LS13, LS14, LS21, LS22, LS23 and LS24 except for the second sub-lens LS12 of the first multi-channel lens LS1 are covered with a material, through light cannot pass, and then are processed with masking, and a test image for the second channel is captured. Then, the other sub-lenses LS11, LS12, LS14, LS21, LS22, LS23 and LS24 except the third sub-lens LS13 of the first multi-channel lens LS1 are covered with a material, through which light cannot pass, and then are processed with masking, and a test image for the second channel is captured. Then, the other sub-lenses LS11, LS12, LS13, LS21, LS22, LS23 and LS24 except for the fourth sub-lens LS14 of the first multi-channel lens LS1 are covered with a material, through light cannot pass, and then are processed with masking, and a test image for the second channel is captured. Similarly, the fifth sub-lens LS21 to the eighth sub-lens LS24 of the second multi-channel lens LS2 are processed with masking and then test images for all channels are captured. In this way, the channels other than the channel to be captured may be processed with masking so that the effect of light incident from the channels other than the channel to be captured may be minimized.

In addition, the image acquisition unit 210 acquires a total of 'n'×'m' reference images by a simulation for generating an image for each of the 'm' number of channels with respect to a position of a pupil gazing at the sub-eyeboxes from 1 to 'n'. A simulation tool for generating a reference image may adopt any one of optical simulation tools, such as code V, LightTools, Virtual Lab and FDTD, which are conventionally known in the art.

In process S220, the mapping data generator 220 calculates an error per channel between the plurality of test images and the plurality of reference images for each channel provided by the multi-channel lens, and generates calibration data for calibrating the error.

When the test image of the (m)th channel at the position of the (n)th sub-eyebox is referred to as $\mathrm{SourceImage}_{n,m}$, and the reference image of the (m)th channel at the position of the (n)th sub-eyebox is referred to as $\mathrm{Ref.Image}_{n,m}$, the calibration data is generated by the Equation 1 described above with reference to FIG. 12.

Further, the reference mapping data is generated by a simulation for calibrating chromatic aberration of the multi-channel lens. In an embodiment, the simulation is executed by the same tool as that of the simulation for generating the plurality of reference images in process S210.

In process S230, the mapping data generator 220 generates calibration mapping data based on the reference mapping data and the generated calibration data. The calibration mapping data may be generated by the Equation 2 described above with reference to FIG. 12.

Figure 16:
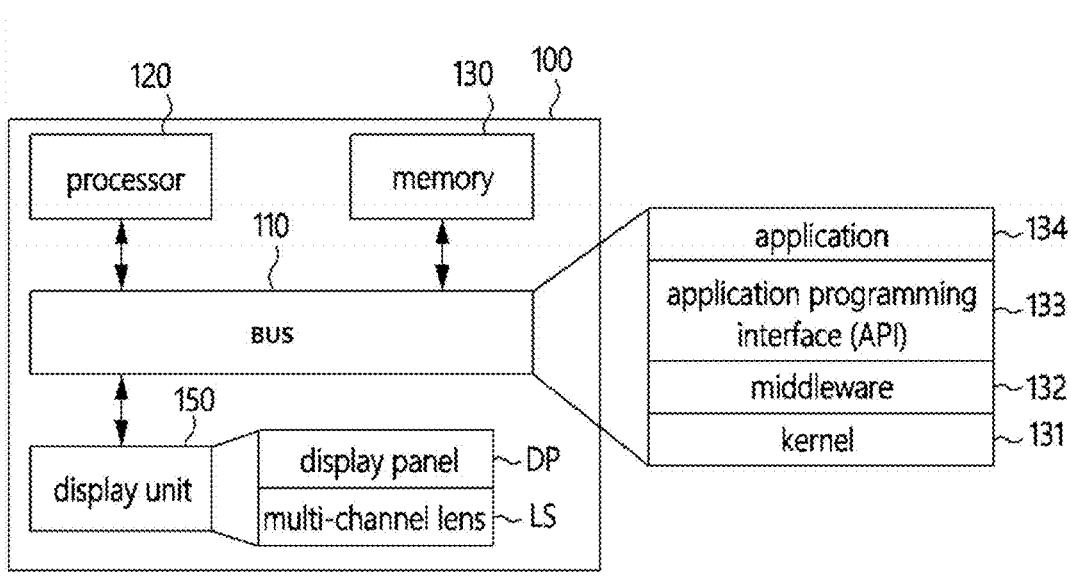
FIG. 16 is a block view illustrating a configuration of a display device according to an embodiment of the disclosure.

FIG. 16 is a block view illustrating a configuration of a display device according to an embodiment of the disclosure.

Referring to FIG. 16, an embodiment of a display device 100 may include a bus 110, a processor 120, a memory 130 and a display unit 150.

The bus 110 may be a circuit for connecting the aforementioned components to each other and transferring communication (e.g., control message) between the aforementioned components.

The processor 120 may receive a request or data or a signal from the other components (e.g., the memory 130, the display unit 150, etc.) through the bus 110, and may control the components by processing computation or data accordingly.

The processor 120 may process at least a portion of information acquired from the other components (e.g., the memory 130, the display unit 150, etc.) and provide the processed information to a user in various ways.

In an embodiment, for example, the processor 120 executes one or more instructions stored in the memory 130, which will be described later, to generate an output image by applying calibration mapping data to the original image, and provides the generated output image to a display panel PD of the display unit 150. In such an embodiment, the calibration mapping data is substantially the same as that described with reference to FIGS. 11 to 15, and is generated based on calibration data for canceling or compensating an error for each channel provided by the multi-channel lens.

The memory 130 may store instructions or data received from the processor 120 or other components (e.g., the display unit 150, etc.) or generated by the processor 120 or other components. The memory 130 may include, for example, programming modules such as a kernel 131, a middleware 132, an application programming interface (API) 133 or an application 134. Each of the aforementioned programming modules may be configured by software, firmware, hardware or their combination of two or more.

The kernel 131 may control or manage system resources (e.g., the bus 110, the processor 120 or the memory 130) used to execute operations or functions implemented in the other programming modules, for example, the middleware 132, the API 133 or the application 134. In addition, the kernel 131 may provide an interface that allows the middleware 132, the API 133 or the application 134 to access individual components of the display device 100 and control or manage the individual components of the display device 100.

The middleware 132 may serve as a relay that allows the API 133 or the application 134 to transmit or receive data by performing communication with the kernel 131. Also, in relation to task requests received from the application 134, the middleware 132 may perform control (e.g., scheduling or load balancing) for a task request by using a method such as assigning a priority capable of using a system resource (e.g., the bus 110, the processor 120 or the memory 130) of the display device 100 for at least one of the applications 134.

The API 133 is an interface through which the application 134 controls a function provided by the kernel 131 or the middleware 132, and may include, for example, at least one interface or function (e.g., command language) for file control, window control, image processing or text control.

The display unit 150 (or display module) may display various types of information (e.g., multimedia data or text data) to a user. In an embodiment, for example, the display unit 150 may include a display panel (e.g., liquid crystal display (LCD) panel or organic light emitting diode (OLED) panel and a display driver integrated circuit (IC) (DDI)). The DDI may display a color by adjusting a pixel of the display panel. In an embodiment, for example, the DDI may include a circuit that converts a digital signal into an RGB analog value and transfers the RGB analog value to the display panel.

According to an embodiment, the display unit 150 may include a display panel DP and a multi-channel lens LS. The display panel DP may include an organic light emitting diodes (OLED) panel, an organic light emitting diodes on silicon (OLEDoS) panel or a light emitting diodes on silicon (LEDoS), but is not limited thereto.

The OLED panel, the OLEDoS panel or the LEDoS may include a panel circuit for implementing colors of pixel areas (or pixels). The panel circuit includes an arrangement of a plurality of OLED elements arranged on a screen, and each of the OLED elements may form a pixel. The OLED element has a structure in which an organic light emitting material is deposited between a cathode electrode and an anode electrode. A current flows to the organic light emitting material between the two electrodes, and the organic light emitting material may emit light by using an electroluminescent phenomenon.

The OLED panel, the OLEDoS panel or the LEDoS may implement colors by using a three-color (e.g., red, green and blue) independent pixel method, a color conversion method (CCM), a color filter method or the like. In an embodiment, For example, the OLED panel, the OLEDoS panel or the LEDoS may represent a dot (a unit representing one color) by combination of OLED elements having three colors (e.g., red, green and blue).

The OLED panel, the OLEDoS panel or the LEDoS may be one of a passive matrix organic light emitting diodes (PMOLED) panel or an active matrix organic light emitting diodes (AMOLED) panel. For example, the AMOLED panel may individually control whether each AMOLED element emits light by embedding a thin film transistor (TFT) in each AMOLED element. When a forward voltage is applied to the thin film transistor, a current may flow to the organic light emitting material at a predetermined threshold voltage or more, and the organic light emitting material may emit light. In this case, as the current flowing into the organic light emitting material is increased, the organic light emitting material may emit brighter light. On the contrary, when a reverse voltage is applied to the thin film transistor, the current hardly flows to the organic light emitting material, and the organic light emitting material cannot emit light.

The OLED panel may include a plurality of pixel areas and a black matrix area. Each of the plurality of pixel areas may be a minimum unit for forming an image. The plurality of pixel areas generally have a same shape as each other, and may be arranged in parallel in a row direction (e.g., X-axis direction) or a column direction (e.g., Y-axis direction), but are not limited thereto. One dot, which is a unit representing one color, may form a pixel group that includes pixel areas (e.g., red pixel area, green pixel area and blue pixel area) capable of emitting three colors (red, green and blue). The pixel group (e.g., three pixel areas) may be repeatedly arranged in a row direction (e.g., X-axis direction) or a column direction (e.g., Y-axis direction). In addition, the pixel group may include a number of pixel areas without being limited to three pixel areas. The organic light emitting material may be disposed in the pixel areas. The black matrix area is separated from the pixel areas, and may distinguish the pixel areas. In an embodiment, for example, the black matrix area may include a black matrix of a color filter, or may include a separator for separating the AMOLED elements. At least a portion of the above-described thin film transistor or a circuit (e.g., OLED panel circuit for implementing a color of a pixel) related thereto may be disposed in the black matrix area.

Figure 17:
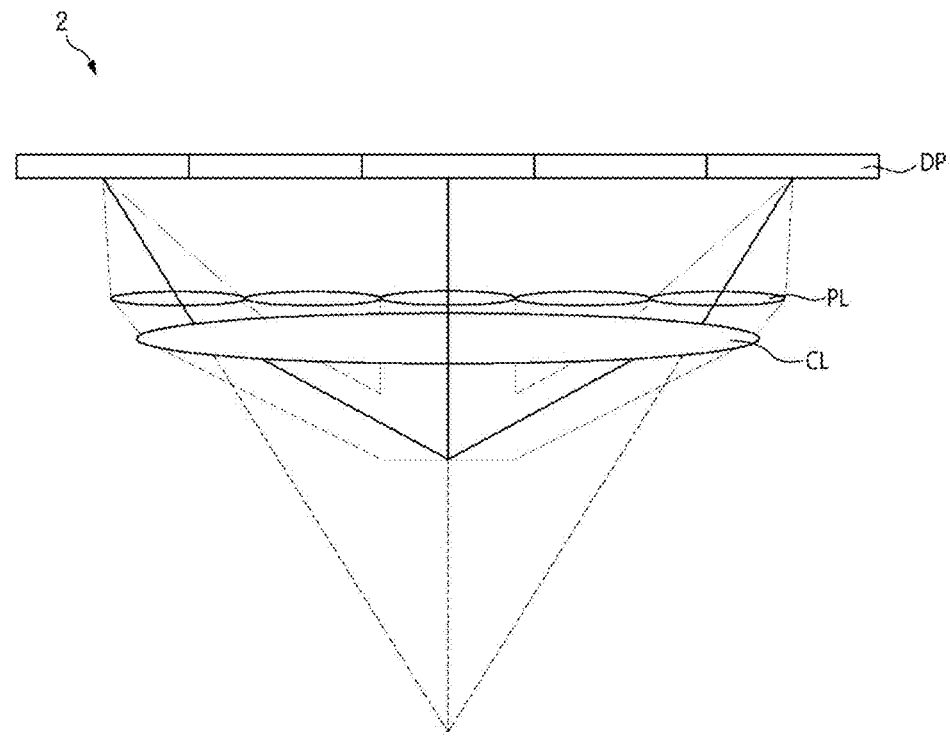
FIG. 17 is a view illustrating an example of a display device according to an alternative embodiment of the disclosure.

FIG. 17 is a view illustrating an example of a display device according to an alternative embodiment of the disclosure.

Referring to FIG. 17, an embodiment of a display device 2 may include a display panel DP and a multi-channel lens LS3. The multi-channel lens LS3 is an array lens of multiple layers, and may include a convex lens CL and a Fresnel lens PL.

The Fresnel lens PL may include continuous concentric grooves etched in the lens. The Fresnel lens PL may be disposed between the convex lens CL and the display panel DP. In such an embodiment, the lens may be an array lens of multiple layers.

Even in case of the array lens of multiple layers, a multi-channel may be provided.

Therefore, even in the display device 2 having the array lens of multiple layers, calibration mapping data may be acquired by the distortion calibration method of the multi-channel lens described with reference to FIGS. 11 to 14. In addition, the calibration image to which the acquired calibration mapping data is applied may be output through the display panel DP, so that the image output through the multi-channel lens LS3 may be an image in which distortion is offset.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A distortion calibration device of a multi-channel lens including a plurality of sub-lenses which provides a plurality of channels, the distortion calibration device comprising:

an image acquisition unit which acquires a plurality of test images generated by capturing an image, which is displayed on a display panel, for each channel of the multi- channel lens by a camera and a plurality of reference images generated for each channel with respect to the multi-channel lens and the display panel, wherein image display light emitted from different areas of a front surface of the display panel pass through respectively channels of the multi-channel lens through different paths; and a mapping data generator which acquires an error per channel between the plurality of test images and the plurality of reference images with respect to each channel and generates calibration data for compensating the error per channel to generate calibration mapping data based on reference mapping data and the calibration data.

2. The distortion calibration device of claim 1, wherein the image acquisition unit divides an eyebox of the display panel into 'n' number of sub-eyeboxes, moves the camera to allow an optical axis of the camera to correspond to the sub-eyeboxes from 1 to 'n', and acquires a total of 'n'×'m' test images by capturing a test image for each of 'm' number of channels at each position of the camera by the camera, wherein each of 'n' and 'in' is a natural number.

3. The distortion calibration device of claim 2, wherein the image acquisition unit acquires a total of 'n'×'m' reference images by a simulation for generating an image for each of the 'm' number of channels with respect to a position of a pupil gazing at the sub-eyeboxes from 1 to 'n'.

4. The distortion calibration device of claim 3, wherein the calibration data is generated by the following equation:

$$\text{Calibration data(offset data)} = f^{-1}(\Sigma(\text{Ref.Image}_{n,m} - \text{SourceImage}_{n,m})),$$

wherein

Ref.Image$_{n,m}$ denotes a reference image of an (m)th channel at a position of an (n)th sub-eyebox, SourceImage$_{n,m}$ denotes a test image of the (m)th channel at the position of the (n)th sub-eyebox, and f$^{-1}$( ) denotes an inverse function of a transfer function in which display information is transferred to an eyeball through a lens, and wherein n is a variable positive integer ranging from 1 to 'n', and m is a variable positive integer ranging from 1 to 'm'.

5. The distortion calibration device of claim 1, wherein the reference mapping data is generated by a simulation which calibrates chromatic aberration of the multi-channel lens.

6. The distortion calibration device of claim 1, wherein the image displayed on the display panel includes a pattern predetermined to estimate a position of the image displayed on the display panel.

7. The distortion calibration device of claim 6, wherein the pattern includes a colored dot or a grid.

8. The distortion calibration device of claim 2, wherein a channel other than a selected channel is masked when a test image for the selected channel is captured at each camera position.

9. A display device comprising:

a display panel which outputs light for display of an image;

at least one multi-channel lens disposed on a light emitting path of the light from the display panel to provide a multi-channel, wherein each of the at least one multi-channel lens includes a plurality of sub-lenses which provides a plurality of channels, and image display light emitted from different areas of a front surface of the display panel pass through respectively channels of the multi-channel lens through different paths;

a memory which stores one or more instructions; and a processor which executes the one or more instructions stored in the memory, wherein the processor executes the one or more instructions to generate an output image by applying calibration mapping data to an original image and provides the output image to the display panel, and the calibration mapping data is generated based on calibration data for compensating an error for each channel provided by the multi-channel lens.

10. The display device of claim 9, wherein the calibration data is generated to compensate an error per channel between a plurality of test images generated by capturing the image, which is displayed on the display panel, for each channel of the multi-channel lens by a camera and a plurality of reference images generated for each channel with respect to the multi-channel lens and the display panel.

11. The display device of claim 10, wherein the plurality of test images are a total of 'n'×'m' number of test images, the plurality of reference images are a total of 'n'×'m' number of reference images, each of 'n' and 'm' is a natural number, the 'n' is a total number of sub-eyeboxes generated by dividing an eyebox of the display panel, and the 'm' is a total number of channels of the multi-channel lens.

12. The display device of claim 11, wherein the calibration data is generated by the following equation:

$$\text{Calibration data(offset data)} = f^{-1}(\Sigma(\text{Ref.Image}_{n,m} - \text{SourceImage}_{n,m})),$$

wherein

Ref.Image$_{n,m}$ denotes a reference image of an (m)th channel at a position of an (n)th sub-eyebox, SourceImage$_{n,m}$ denotes a test image of the (m)th channel at the position of the (n)th sub-eyebox, and f$^{-1}$( ) denotes an inverse function of a transfer function in which display information is transferred to an eyeball through a lens, and wherein n is a variable positive integer ranging from 1 to 'n', and m is a variable positive integer ranging from 1 to 'm'.

13. The display device of claim 9, wherein the calibration mapping data is generated based on the calibration data and reference mapping data, and the reference mapping data is generated by a simulation which calibrates chromatic aberration of the multi-channel lens.

14. A distortion calibration method of a multi-channel lens including a plurality of sub-lenses which provides a plurality of channels, the distortion calibration method comprising:

acquiring a plurality of test images generated by capturing an image, which is displayed on a display panel by passing through the multi-channel lens, for each channel of the multi-channel lens by a camera and a plurality of reference images generated for each channel with respect to the multi-channel lens and the display panel, wherein image display light emitted from different areas of a front surface of the display panel pass through respectively channels of the multi-channel lens through different paths;

acquiring an error per channel between the plurality of test images and the plurality of reference images with respect to each channel and generating calibration data for compensating the error per channel; and generating calibration mapping data based on reference mapping data and the calibration data.

15. The distortion calibration method of claim 14, wherein the acquiring the plurality of test images and the plurality of reference images generated for each channel with respect to the multi-channel lens and the display panel includes dividing an eyebox of the display panel into 'n' number of sub-eyeboxes, moving the camera to allow an optical axis of the camera to correspond to the sub-eyeboxes from 1 to 'n', acquiring a total of 'n'×'m' test images by capturing a test image for each of 'm' number of channels at each position of the camera by the camera, and acquiring a total of 'n'×'m' reference images by a simulation for generating an image for each of the 'm' number of channels with respect to a position of a pupil gazing at the sub-eyeboxes from 1 to 'n', wherein each of 'n' and 'm' is a natural number.

16. The distortion calibration method of claim 14, wherein the calibration data is generated by the following equation:

$$\text{Calibration data(offset data)} = f^{-1}(\Sigma(\text{Ref.Image}_{n,m} - \text{SourceImage}_{n,m}),$$

wherein $\text{Ref.Image}_{n,m}$ denotes a reference image of an (m)th channel at a position of an (n)th sub-eyebox, $\text{SourceImage}_{n,m}$ denotes a test image of the (m)th channel at the position of the (n)th sub-eyebox, and $f^{-1}(\ )$ denotes an inverse function of a transfer function in which display information is transferred to an eyeball through a lens, and wherein n is a variable positive integer ranging from 1 to 'n', and m is a variable positive integer ranging from 1 to 'm'.

17. The distortion calibration method of claim 14, wherein the acquiring the plurality of test images and the plurality of reference images generated for each channel with respect to the multi-channel lens and the display panel includes masking a channel other than a selected channel when a test image for the selected channel is captured at each camera position.

18. The distortion calibration method of claim 14, wherein the reference mapping data is generated by a simulation which calibrates chromatic aberration of the multi-channel lens.

19. The distortion calibration method of claim 14, wherein the image displayed on the display panel includes a pattern predetermined to estimate a position of the image displayed on the display panel.

20. The distortion calibration method of claim 19, wherein the pattern includes a colored dot or a grid.

* * * * *